US00RE48532E

(19) United States
(12) Reissued Patent
Bowen et al.

(10) Patent Number: US RE48,532 E
(45) Date of Reissued Patent: Apr. 27, 2021

(54) CHARGING DEVICE FOR ELECTRONIC VAPORIZATION DEVICE

(71) Applicant: JUUL Labs, Inc., San Francisco, CA (US)

(72) Inventors: Adam Bowen, San Francisco, CA (US); James Monsees, San Francisco, CA (US); Steven Christensen, San Francisco, CA (US); Joshua Morenstein, San Francisco, CA (US); Christopher Nicholas HibmaCronan, Oakland, CA (US)

(73) Assignee: JUUL Labs, Inc., San Francisco, CA (US)

(21) Appl. No.: 29/674,910

(22) Filed: Dec. 27, 2018

Related U.S. Patent Documents

Reissue of:

(64) Patent No.: Des. 744,419
Issued: Dec. 1, 2015
Appl. No.: 29/499,025
Filed: Aug. 11, 2014

U.S. Applications:

(62) Division of application No. 29/628,194, filed on Dec. 1, 2017, now Pat. No. Re. 47,994, which is an application for the reissue of Pat. No. Des. 744,419.

(51) LOC (13) Cl. ..... 13-02

(52) U.S. Cl.
USPC ..... D13/108; D27/194

(58) Field of Classification Search
USPC ..... D13/107–110, 118–119, 182, 199; D14/251, 253, 432, 434; D27/172, 193, D27/194

(Continued)

(56) References Cited

U.S. PATENT DOCUMENTS 576,653 A 2/1897 Bowlby
969,076 A 8/1910 Pender (Continued)

FOREIGN PATENT DOCUMENTS

CN 3037571 11/1995
CN 301111821 1/2010

(Continued)

*Primary Examiner* — Darlington Ly
(74) *Attorney, Agent, or Firm* — Mintz Levin Cohn Ferris Glovsky and Popeo, P.C.

(57) CLAIM

The ornamental design for a charging device for electronic vaporization device, as shown and described.

DESCRIPTION

*This application is a divisional reissue of U.S. application Ser. No. 29/628,194, filed on Dec. 1, 2017, which is an application for reissue of U.S. Pat. No. D. 744,419, issued on Dec. 1, 2015, which corresponds to U.S. patent application Ser. No. 29/499,025, the entire contents of each of which are incorporated herein by reference.*

FIG. 1 is a perspective view of a charging device for electronic vaporization device, showing our new design;
FIG. 2 is a top plan view thereof;
FIG. 3 is a left side elevation view thereof;
FIG. 4 is a rear elevation view thereof;
FIG. 5 is a right side elevation view thereof;
FIG. 6 is a front elevation view thereof; and,
FIG. 7 is a bottom plan view thereof.

(Continued)

(Amended)

The broken lines [shown in the drawings are included for the purpose of illustrating environmental structure and] *illustrate portions of the charging device for electronic vaporization device that* form no part of the claimed design.

1 Claim, 7 Drawing Sheets

Matter enclosed in heavy brackets [ ] appears in the original patent but forms no part of this reissue; matter printed in italics indicates the additions made by reissue.

(58) Field of Classification Search
CPC ..... Y02E 60/12; Y02E 90/14; Y02E 90/122; Y02E 90/128; Y02E 90/163; H02J 7/025; H02J 7/0042; H02J 7/0044; H02J 7/0045; H02J 7/0003; H01F 38/14; H01R 13/6675; H01M 2/1022; H01M 2/1055; H01M 10/44; H01M 10/46; H01M 10/425; B60L 11/182; A24F 47/008
See application file for complete search history.

(56) References Cited

U.S. PATENT DOCUMENTS

| | | | | | |
|---|---|---|---|---|---|
| 1,505,748 | A | | 8/1924 | Louis | |
| 2,199,885 | A | | 5/1940 | Kravchuk | |
| 2,459,656 | A | | 1/1949 | Jack | |
| 2,676,237 | A | | 4/1954 | Tooker | |
| 4,241,742 | A | | 12/1980 | Hilding | |
| D292,437 | S | | 10/1987 | Wind, III | |
| 4,990,939 | A | | 2/1991 | Sekiya et al. | |
| 5,529,078 | A | | 6/1996 | Rehder et al. | |
| 5,843,014 | A | | 12/1998 | Lattin et al. | |
| D405,007 | S | | 2/1999 | Naas, Sr. | |
| 5,878,752 | A | | 3/1999 | Adams et al. | |
| 5,967,310 | A | | 10/1999 | Hill | |
| 6,269,966 | B1 | | 8/2001 | Pallo et al. | |
| D458,409 | S | | 6/2002 | Najar et al. | |
| 6,743,030 | B2 | | 6/2004 | Lin et al. | |
| D498,328 | S | | 11/2004 | Harel | |
| D500,302 | S | | 12/2004 | Deguchi | |
| 6,909,840 | B2 | | 6/2005 | Harwig et al. | |
| D514,741 | S | | 2/2006 | Cohen Harel | |
| 7,019,491 | B2 | | 3/2006 | Bozzone et al. | |
| D521,445 | S | | 5/2006 | Liu | |
| D529,044 | S | | 9/2006 | Andre et al. | |
| D532,776 | S | | 11/2006 | Griffin | |
| 7,214,075 | B2 | | 5/2007 | He et al. | |
| 7,275,941 | B1 | | 10/2007 | Bushby | |
| D557,209 | S | * | 12/2007 | Ahlgren et al. | D13/108 |
| D576,619 | S | | 9/2008 | Udagawa et al. | |
| D577,019 | S | | 9/2008 | Udagawa et al. | |
| D579,934 | S | | 11/2008 | Okamoto et al. | |
| D591,758 | S | | 5/2009 | Lee | |
| D607,403 | S | | 1/2010 | Hara et al. | |
| D610,588 | S | | 2/2010 | Chen | |
| D611,409 | S | * | 3/2010 | Green et al. | D13/110 |
| 7,753,055 | B2 | | 7/2010 | Bryman | |
| D624,012 | S | | 9/2010 | de Medeiros et al. | |
| D631,055 | S | | 1/2011 | Gilbert et al. | |
| D631,883 | S | | 2/2011 | Maier | |
| 7,905,236 | B2 | | 3/2011 | Bryman et al. | |
| 7,931,149 | B2 | | 4/2011 | Gilad et al. | |
| D638,430 | S | | 5/2011 | Lee et al. | |
| D639,303 | S | | 6/2011 | Ni et al. | |
| D648,726 | S | | 11/2011 | Behar et al. | |
| D649,932 | S | * | 12/2011 | Symons | D13/108 |
| 8,170,623 | B2 | | 5/2012 | Dorogusker et al. | |
| D674,748 | S | * | 1/2013 | Ferber et al. | D13/108 |
| D682,841 | S | | 5/2013 | Suetake et al. | |
| D686,987 | S | * | 7/2013 | Vanstone et al. | D13/108 |
| D687,042 | S | | 7/2013 | Yoneta et al. | |
| D692,615 | S | | 10/2013 | Verleur | |
| D697,029 | S | | 1/2014 | Chiu | |
| D700,572 | S | * | 3/2014 | Esses | D13/108 |
| D703,680 | S | | 4/2014 | Lin | |
| D704,629 | S | * | 5/2014 | Liu | D13/108 |
| D704,634 | S | * | 5/2014 | Eidelman et al. | D13/108 |
| 8,881,738 | B2 | | 11/2014 | Bryman | |
| D725,124 | S | | 3/2015 | Lin et al. | |
| 9,032,968 | B2 | | 5/2015 | Glasberg et al. | |
| 9,066,543 | B2 | | 6/2015 | Cameron | |
| 9,167,849 | B2 | | 10/2015 | Adamic | |
| D749,510 | S | | 2/2016 | Liu | |
| D773,115 | S | * | 11/2016 | Liu | D27/167 |
| D776,338 | S | * | 1/2017 | Lomeli | D27/163 |
| D792,957 | S | * | 7/2017 | Starkenburg | D23/363 |
| 9,717,277 | B2 | | 8/2017 | Mironov | |
| 9,775,380 | B2 | | 10/2017 | Fernando et al. | |
| 10,045,568 | B2 | | 8/2018 | Monsees et al. | |
| 2005/0029137 | A1 | | 2/2005 | Wang | |
| 2006/0288169 | A1 | | 12/2006 | Steiner | |
| 2007/0191756 | A1 | | 8/2007 | Tapper | |
| 2007/0229025 | A1 | | 10/2007 | Tsai et al. | |
| 2009/0283103 | A1 | | 11/2009 | Nielsen et al. | |
| 2009/0293892 | A1 | | 12/2009 | Williams et al. | |
| 2010/0301032 | A1 | | 12/2010 | Johnson | |
| 2010/0307116 | A1 | | 12/2010 | Fisher | |
| 2011/0236002 | A1 | | 9/2011 | Oglesby et al. | |
| 2012/0086391 | A1 | | 4/2012 | Smith | |
| 2012/0188687 | A1 | | 7/2012 | Yamamoto | |
| 2012/0223673 | A1 | | 9/2012 | Chen et al. | |
| 2012/0325227 | A1 | | 12/2012 | Robinson et al. | |
| 2013/0062335 | A1 | | 3/2013 | Davis, Jr. | |
| 2013/0220847 | A1 | | 8/2013 | Fisher et al. | |
| 2014/0014124 | A1 | * | 1/2014 | Glasberg et al. | A24F 47/008 131/328 |
| 2014/0021190 | A1 | | 1/2014 | Sardar | |
| 2015/0108019 | A1 | | 4/2015 | Liu | |
| 2015/0114410 | A1 | | 4/2015 | Doster | |
| 2015/0128967 | A1 | | 5/2015 | Robinson et al. | |
| 2015/0167976 | A1 | | 6/2015 | Recio | |
| 2016/0021771 | A1 | | 1/2016 | Zhang et al. | |
| 2016/0167846 | A1 | | 6/2016 | Zahr et al. | |
| 2017/0144827 | A1 | | 5/2017 | Batista | |
| 2017/0164657 | A1 | | 6/2017 | Batista | |
| 2017/0229888 | A1 | | 8/2017 | Liu | |

FOREIGN PATENT DOCUMENTS

| | | | |
|---|---|---|---|
| CN | 201408820 | Y | 2/2010 |
| CN | 301604882 | | 7/2011 |
| CN | 202004499 | U | 10/2011 |
| CN | 203182012 | U | 9/2013 |
| CN | 302660481 | | 11/2013 |
| CN | 302660490 | | 11/2013 |
| CN | 302680448 | | 12/2013 |
| CN | 302803209 | | 4/2014 |
| CN | 302814868 | | 5/2014 |
| JP | 2001165437 | A | 6/2001 |
| JP | D1315127 | | 11/2007 |

* cited by examiner

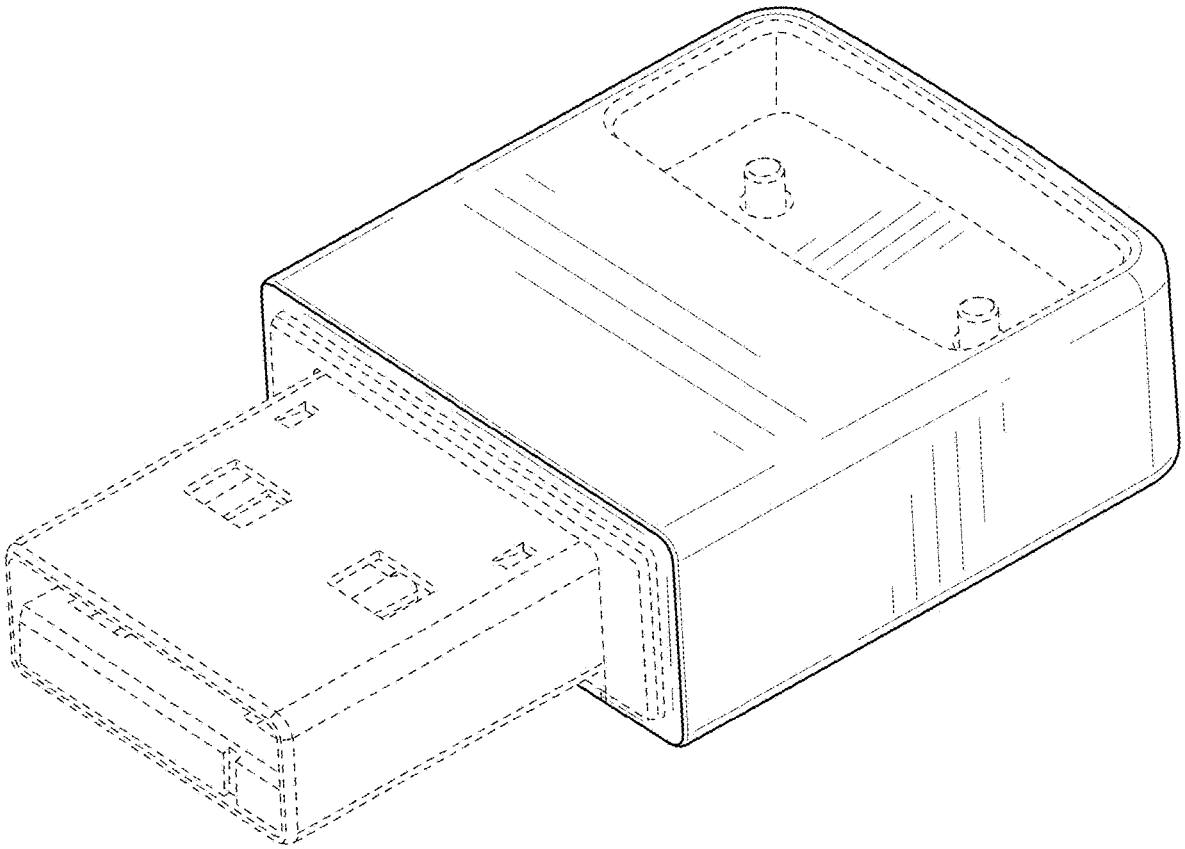
FIG. 1
(Amended)

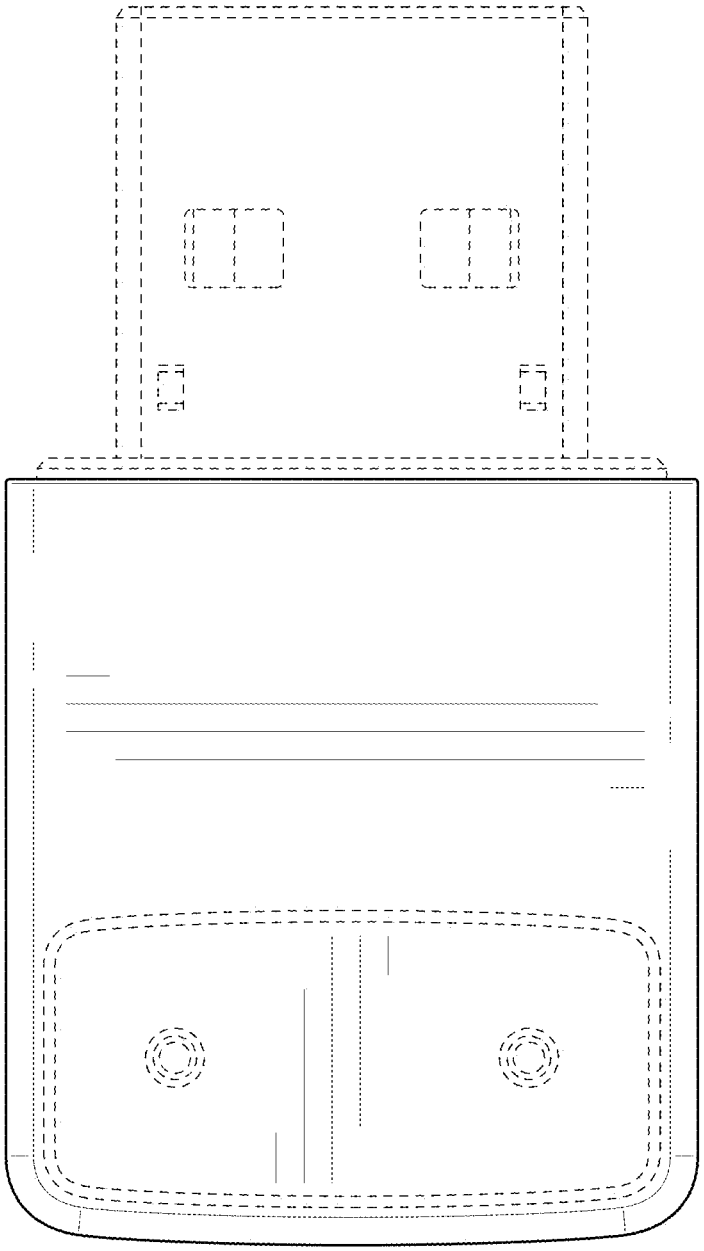
FIG. 2
(Amended)

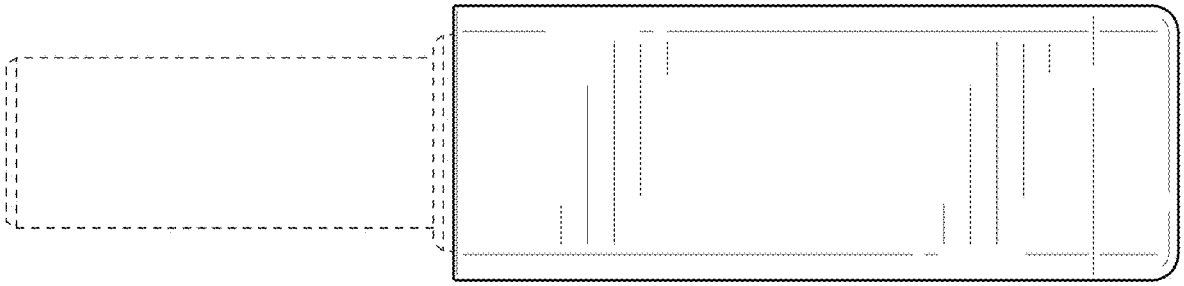
FIG. 3
(Amended)

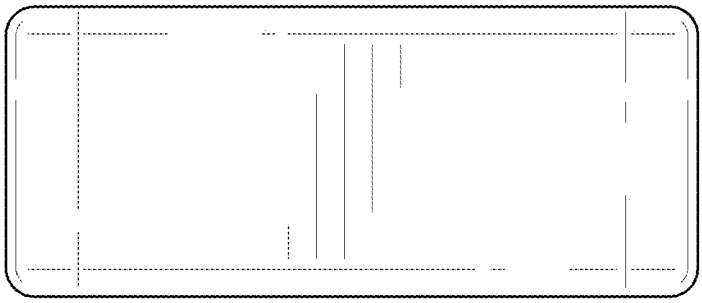
FIG. 4
(Amended)

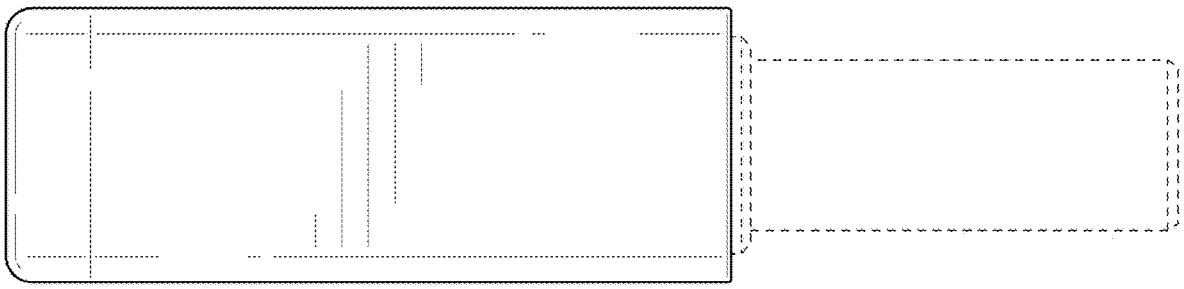
FIG. 5
(Amended)

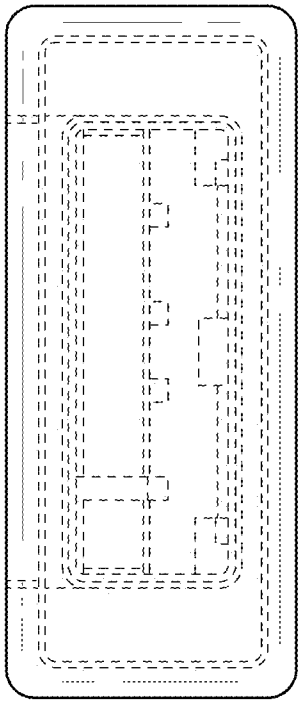
FIG. 6
(Amended)

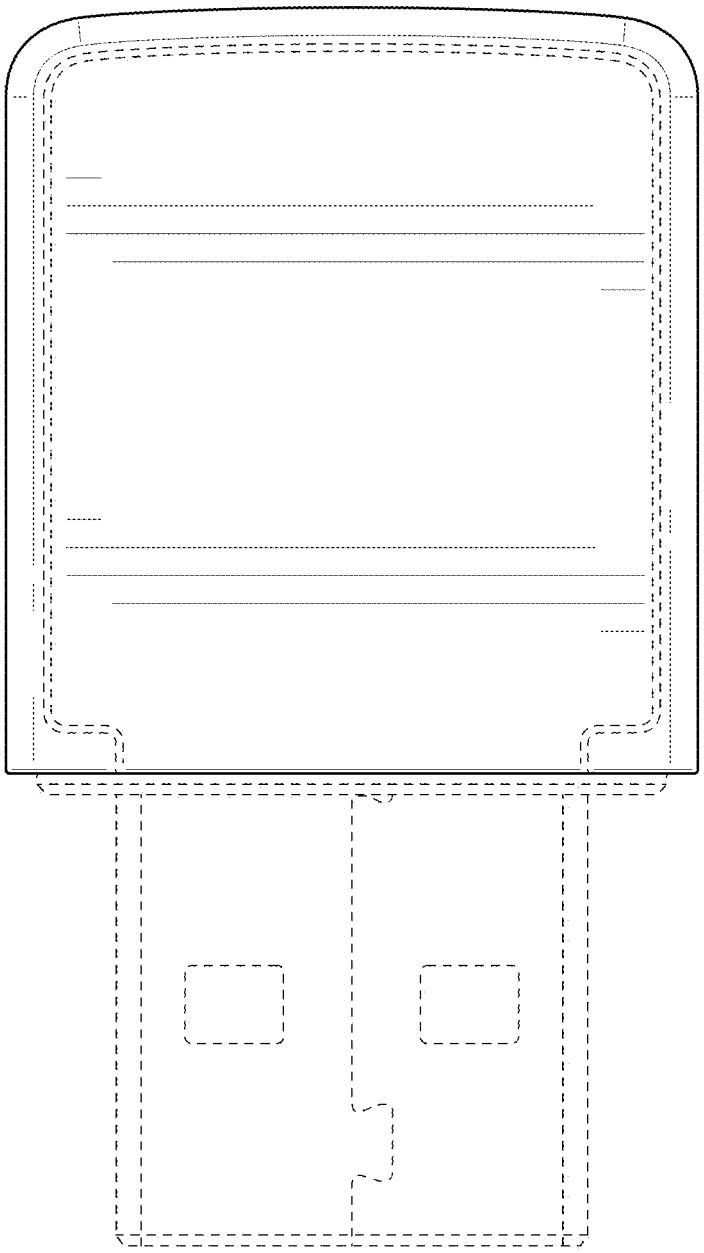
FIG. 7
(Amended)